June 29, 1965  M. G. ANDERSON ETAL  3,191,654
SAFETY TIRE AND VALVE THEREFOR

Filed May 31, 1962  3 Sheets-Sheet 1

INVENTORS
JOSEPH S. HAWKES
MALCOLM G. ANDERSON
BY
*J.B. Holden*
ATTORNEY

June 29, 1965  M. G. ANDERSON ETAL  3,191,654
SAFETY TIRE AND VALVE THEREFOR
Filed May 31, 1962  3 Sheets-Sheet 2

INVENTORS
JOSEPH S. HAWKES
MALCOLM G. ANDERSON
BY
J. B. Holden
ATTORNEY

June 29, 1965  M. G. ANDERSON ETAL  3,191,654
SAFETY TIRE AND VALVE THEREFOR
Filed May 31, 1962  3 Sheets-Sheet 3

INVENTORS
JOSEPH S. HAWKES
BY MALCOLM G. ANDERSON
ATTORNEY

United States Patent Office 3,191,654
Patented June 29, 1965

3,191,654
SAFETY TIRE AND VALVE THEREFOR
Malcolm G. Anderson, Hudson, and Joseph S. Hawkes, Cuyahoga Falls, Ohio, assignors to The Goodyear Tire & Rubber Company, Akron, Ohio, a corporation of Ohio
Filed May 31, 1962, Ser. No. 199,140
15 Claims. (Cl. 152—341)

The present invention relates to a safety tire in which there are radially disposed inner and outer chambers having a dividing wall between them, the dividing wall acting as a reserve or inner tire upon loss of air from the outer chamber due to puncture or blowout.

One object of this invention is to provide improved means for inflating the chambers of such a safety tire.

Another object is to provide an inner safety tire that may be used with substantially any tubeless tire.

Another object is to make the inner or reserve chamber at a reduced cost by eliminating more complicated procedures previously used and allowing the use of less expensive materials.

Another object is to prevent chafing between the inner reserve tire and the outer tubeless tire.

Still another object is to provide improved single inflation means, which will also maintain higher pressures in the inner chamber than in the outer chamber, such means being so constructed that no special instructions or equipment for inflation are needed, thus eliminating the necessity for educating the public as to special inflation techniques.

Other objects and advantages of this invention will become apparent hereinafter as the description thereof proceeds, the novel features, arrangements and combinations being clearly pointed out in the specification as well as in the claims thereunto appended.

Figure 1:
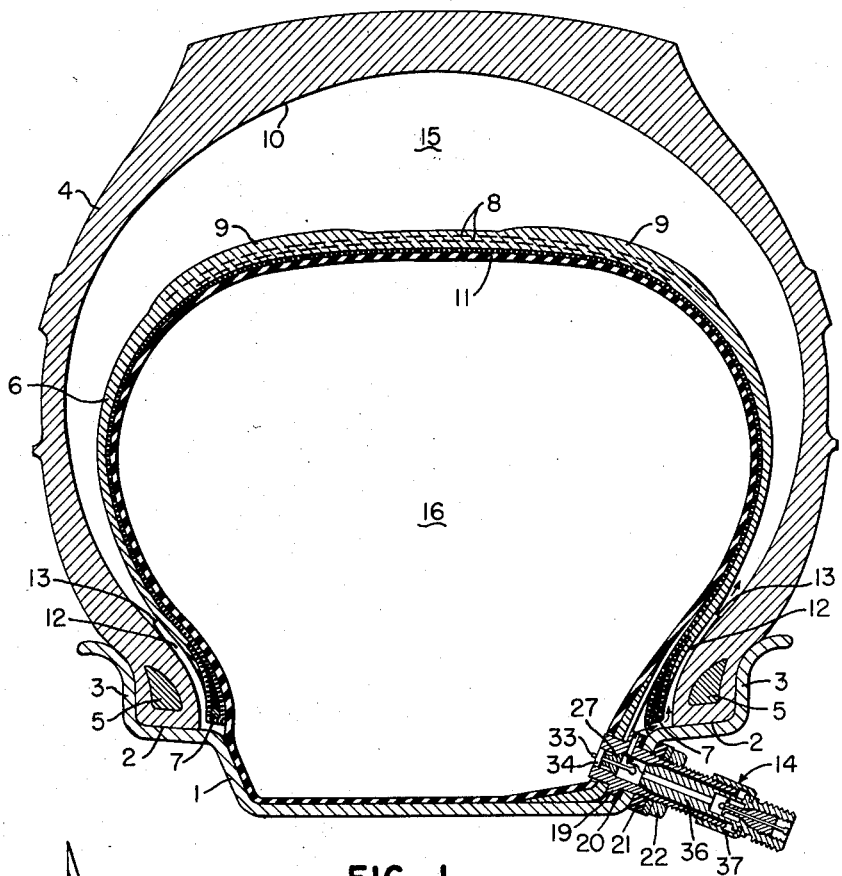
FIG. 1 is a cross-section of a safety tire embodying this invention.

A tire rim 1 (FIG. 1) is provided with bead seats 2 and retaining flanges 3. A tubeless tire 4 having beads 5 is mounted on the rim in the position shown. An inner tire 6 is provided with beads 7 and rubberized reinforcing material 7' such as fabric or wire extending from bead to bead and anchored to the beads of the inner tire 6. The inner edges containing the beads 7 are seated on the rim seats 2 adjacent the inner edges of the tire 4 containing the beads 5. The outer circumferential surface of the inner tire may also be provided with transversely extending wires 8 arranged in two layers at opposite angles to the center line of the circumference of the inner tire as a protection against puncturing objects (see United States Patent 3,025,902 granted March 20, 1962). The shoulders of the inner tire 6 may be provided with strips of rubber 9 which are more cut and abrasion resistant than the rubber lining the inner surface 10 of the tire 4. Thus under emergency operation if wear does occur such wear will be minor and principally on the inner surface of the tire 4. A suitable lubricant such as castor oil and certain silicone oils may be placed in the outer chamber to reduce friction between the tires during emergency operation.

Figure 10:
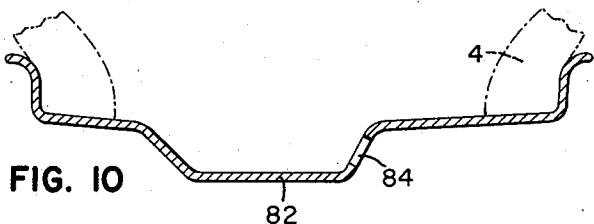
FIGS. 10 and 11 are fragmentary cross-sectional views of two different commercial rims used to mount the same size tire and showing a tire bead mounted thereon.
Figure 11:
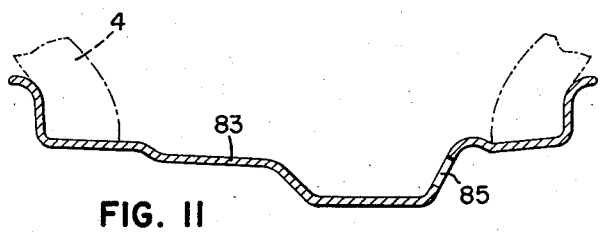

An inner tube 11 is arranged within the space defined by the inner tire 6 and the rim 1. While it is within the scope of the invention to have the tube and inner tire integral with each other, it is preferable that they be made separate in order to provide a less expensive construction and one that may be used with rims having valve openings spaced at different distances from the rim side flange 3 as shown in FIGS. 10 and 11. If the inner tube is made as a part of the inner tire, the valve would necessarily have a predetermined position with respect to the inner tire and, therefore, it would be necessary to provide different positions for the valves on inner tubes used on rims having different positions of the valve opening with respect to the retaining flanges. By using an inner tube 11 separate from the inner tire 6 the inner tire may be first positioned within the outer tire 4 and then the inner tube may be arranged within the tire 6. Thus, when mounted on the rim, the inner tire 6 may assume its intended position and the tube may assume its proper position with respect to the rim and inner tire regardless of the position of the valve opening in the rim. Thus, the same inner tire and inner tube may be employed for any given size tubeless tire 4 regardless of the width of the bead seat on the rim, the position of the valve opening with respect to the bead of the tire 4, or the overall rim width. This eliminates multiple constructions for the inner tube and inner tire such as would be necessary if the tire and tube were integral.

Figure 6:
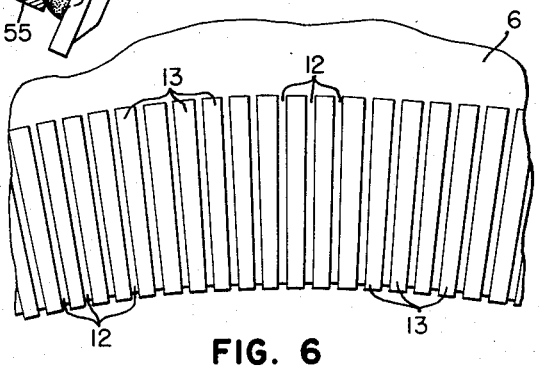
FIG. 6 is a fragmentary view of the outer surface of one of the inner beaded edges of the inner tire.

Referring now particularly to FIGS. 1 and 6, it is to be noted that the outer surface of the inner tire is provided with a series of grooves 12 formed by spaced ribs 13 which extend under the beads and upwardly along the outer side walls of the inner tire 6 as shown in FIGS. 1 and 6. These permit air to pass between the adjacent walls of tires 4 and 6 from a valve 14 to the outer chamber 15 in a manner to be described later. Alternatively, the grooves may be formed by molding them in the outer surface of the tire 6 but raised ribs are preferable in order to prevent sealing the upper ends of the grooves, FIG. 1, by the inner wall of the tire 4 if the inner tire, under its superior pressure, is forced against the inner wall of the tire at the upper ends of the grooves. This sealing off could also be avoided by having the grooves extend radially a greater distance if the grooves are molded in the normal outer surface of the tire below that surface.

Briefly described, valve 14 provides means for supplying air to the outer chamber 15 through a lateral port and to the inner chamber 16 through an axially etxending port, the effective cross-sectional areas of these ports being designed to supply air to the inner chamber at such a rate as to build up the pressure in the inner chamber at a faster rate and to an ultimately higher pressure than that in the outer chamber.

It is not necessary that the inner tire 6 be air impervious as it is only required to have sufficient strength, as by cord reinforcement 7' to limit any material radial expansion of the inner tube 11, the inner tube constituting means for retaining the air in the inner chamber formed by inner tire 6 and the rim 1. Since tire 6 is not required to have impervious walls, it may be made relatively thin and, in fact, may be constructed only of cords or loosely woven fabric covered preferably with just sufficient rubber, at least on the inner surface, to prevent abrasion of the inner tube. The outer surface of the inner tire may be provided with strips of rubber 9, previously described. The use of wires 8, while preferable, since they tend to prolong the life of the inner tire, is not absolutely essential to the invention. Grooves 12 are formed in the tire 6 at each side thereof so that regardless of which way the tire 6 is inserted in the tire 4, there will be grooves 12 adjacent the valve grooves 25 to thus insure inflation of the outer chamber 15.

When the outer chamber 15, fails, as by a blowout or puncture of the tire 4, the inner tire 6 carries the load and operates on the inner circumference of the outer tire 4. This provides means by which the operation of the vehicle may be continued for some considerable distance to permit the operator to reach a place where he may safely change the tire, make a repair, or reach a service station where he can have this work done for him.

Figure 5:
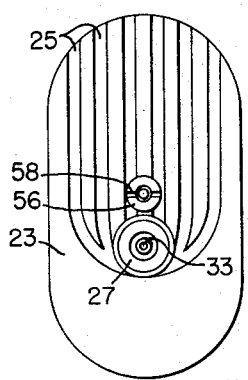
FIG. 5 is a plan view, partly in cross-section, of the valve base looking in the direction 5—5 of FIG. 3.

The valve construction shown in FIGS. 1 and 2 will be described with particular reference to FIG. 2. This valve has stem 17 which is threaded exteriorly at 18 and is provided with an inner flange 19. A rubber washer 20 is arranged between the rim 1 and flange 19. A similar rubber washer 21 is on the other side of the rim and a threaded nut 22 on the threaded portion 18 is used to clamp the stem 17 in place on the rim in airtight relation thereto. The valve stem 17 is provided with a rubber base 23, the inner face 24 of which may be vulcanized to the inner tube 11 in the usual manner. The outer surface of the base portion 23 is provided with a series of grooves 25, more particularly shown in plan view in FIG. 5 on a similar base of a modified valve structure. The grooves 25 should preferably have a different spacing than the grooves 12, the spacing being such as to insure there can be no blockage of all the grooves 12 when the tube 11 and tire 6 are in operative positions regardless of their relative angular positions. The lands between the grooves 25 should also be of sufficient width to prevent their collapse during the molding of the valve base to the tube in the curing press. If the ribs collapse during the tube curing process, it is possible that the grooves will become blocked and useless. A minimum width of ⅛" is recommended for the lands.

Figure 2:
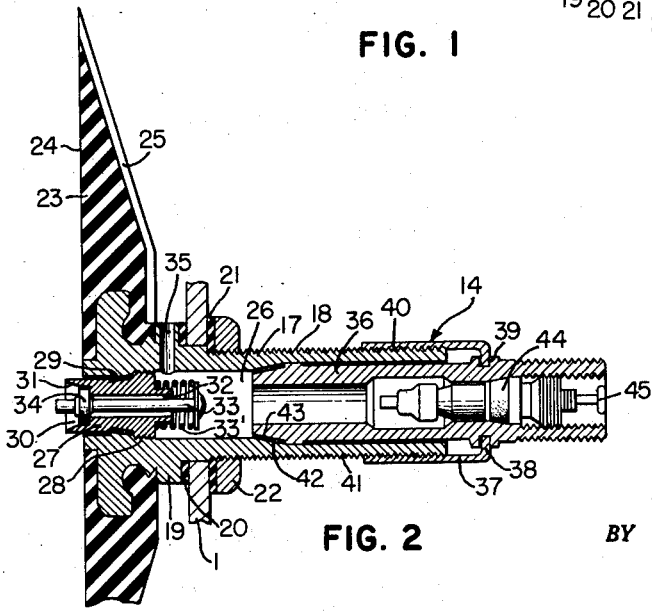
FIG. 2 is a cross-section on an enlarged scale of the valve shown in FIG. 1.
Figure 4:
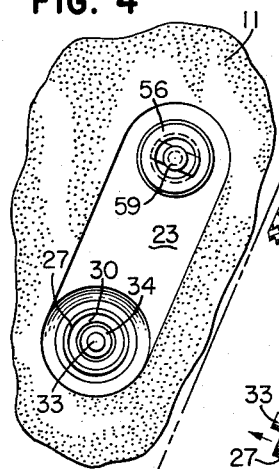
FIG. 4 is a fragmentary view looking in the direction 4—4 of FIG. 3.

The valve stem has a passage 26 extending therethrough provided at its inner end, which is at the left in FIG. 2, with a check valve comprising a barrel 27 with exterior threads therein cooperating with internal threads on the casing 17 as indicated at 28. Sealing of the barrel is accomplished by means of the usual rubber or plastic sealing ring 29 on the barrel 27. The inner end of the barrel 27 has a port 30, the wall of which is flared outwardly at 31 for a purpose to be described later. The barrel 27 has a central opening 32 in which a pin 33 is loosely mounted for axial movement and the inner end of this pin is provided with a check valve 34 sealed against a valve seat at the inner end of the barrel 27 when the valve is in its closed position as shown in FIG. 2. When air is forced through the passage 26, the air will act against the check valve 34 to move the valve to the left, thus permitting air to enter the inner chamber 16 through the port 30. The clearance between the wall of the port 30 and the check valve 34 is specifically designed to supply air to the inner chamber 16 at a rate to build up the air pressure in that chamber faster than in the outer chamber 15. The flared portion 31, previously referred to, is for the purpose of guiding the valve 34 onto its seat on its return to closed position to thus insure proper seating of the valve. Since this valve must be very sensitive, the pin 33 on which it is mounted has appreciable clearance with the wall of the port 30.

In the outer end of the stem 17, there is provided a housing 36, provided with a threaded nut 37 having a flange 38 rotatably mounted in the groove 39 in the housing 36. The nut 37 has internal threads 40 meshing with threads 41 on the stem 7 so that the nut 17 may be tightened to move the housing 36 to the left as viewed in FIG. 2 and effect a seal of the housing against a tapered seat 42 in the passage 26 by means of the sealing ring 43. This housing is provided with any suitable standard valve core 44 having a pin 45 which may be depressed to open the passage through the core in a well-known manner and thus allow air to be supplied to or exhausted from the passage 26 on inflation and deflation respectively.

On inflation, the pin 45 of the valve core 44 is depressed when the usual air chuck at the end of an air supply hose is applied and air then flows into the passage 26. This flow of air into the passage 26 causes opening of the valve 34 as previously described, thus permitting the air to enter the inner chamber through port 30. At the same time, air moves laterally from the passage 26 through the open port 35 and grooves 25 and 12 into the outer chamber 15.

Note that with a valve constructed as in FIG. 2, the valve 34 will remain closed as long as the pressure in the inner chamber 16 is sufficient to overcome the pressure in the passage 26 and the centrifugal force acting on the valve 34. Valve 34 will not open merely by depressing the pin 45. Therefore, if it is desired to check the pressure in the outer chamber 15, this may be done in the usual manner by using a suitable pressure gauge. If the valve cores were mechanically interconnected, air would be released from the inner chamber upon depressing pin 45 and there would be a tendency to equalize the pressure in the chambers 15 and 16. To deflate the chambers 15 and 16 completely the nut 37 is unthreaded from the stem 17 and then the housing 36 is removed, after which barrel 27 may be removed by unthreading it from stem 17.

Before proceeding with a description of the other forms of the invention, the operation of the invention shown in FIG. 1 will be described. The inner tire 6 is inserted in the outer tire 4 and the tube 11 is mounted in the inner tire 6 before application of the tires and tube to the rim. As usual, when mounting tires on a drop-center rim, it is necessary that the beads of the tires first be positioned in the drop-center portion thereof and then moved outwardly onto the bead seats 2. The movement of the beads onto their seats is accomplished by the pressure in the inner tube 11 and, therefore, special seating means usually employed for mounting tubeless tires are unnecessary. Since tire 6 is separate from tire 4, it is possible that beads 7 of the inner tire will not seat properly on the rim seats, but this difficulty could be overcome by applying a somewhat tacky material to the abutting surfaces of the tires 4 and 6 prior to mounting the tires on the rim to thus hold them in proper juxtaposition. No such problem presents itself when using the form of the invention shown in FIG. 3 to be described later.

By properly proportioning the effective areas of the ports 30 and 35, the air may be caused to enter the chambers 15 and 16 at such rates to cause a more rapid build-up of pressure in the inner chamber than in the outer chamber. This difference in pressure is preferably in the order of 6 pounds or more to insure that the abutting surfaces of the tires 4 and 6, at the bead areas, are firmly held in engagement with each other during normal and emergency use of the tires and also insures the holding of the beads 5 and 7 on the rim seat. By this means chafing of the contacting areas is also prevented or at least minimized to such an extent that it creates no problem.

When the air chuck is removed from the valve 14, the valve core 44 closes in the usual manner to prevent escape of air from the passage 26 and the superior pressure in the inner tire chamber 16 closes the valve 34 to prevent escape of air from that chamber into the passage 26 and chamber 15.

In case of failure of the outer chamber as in the case of a blowout or puncture of the outer tire 4, the air will be retained in the chamber 16 and the outer circumference of the inner tire 6 will contact the inner circumference of the outer tire and continued operation of the vehicle is possible without material inconvenience and without destruction of the inner tire since a lubricant is employed to lubricate the contacting areas.

The principal load is usually carried by the shoulders of the inner tire and preferably only these shoulders are covered with the more abrasion-resistant rubber 9, but if found necessary or desirable the entire outer circumference of the tire 6 may be covered with this rubber. While the inner tire 6 is shown as being relatively thick at the tread portion, in actual practice the thickness thereof is much less than shown and, disregarding the rubber strips 9, the thickness of the layers at the tread area of tire 6, even including the wire layers, may be only 1/10″ with the cord layers comprising about 1/2 that amount.

With the present construction, the inner tire 6 may be made by the flat drum tire building method well understood in the art and cured to the shape shown by known methods used for tires. The inner tube may also be made by known methods and the valve attached to the tube in the usual manner before cure.

The main feature of this valving arrangement is that both chambers 15 and 16 may be inflated to the desired pressures without employing special techniques. Consequently, it does not require extensive education of the public or special facilities for inflation. Since the tire is inflated in the usual manner to secure the desired pressures, it removes the element of chance that the chambers may be inflated incorrectly as has happened with some commercial structures which required special techniques and facilities for the correct inflation thereof.

Figure 3:
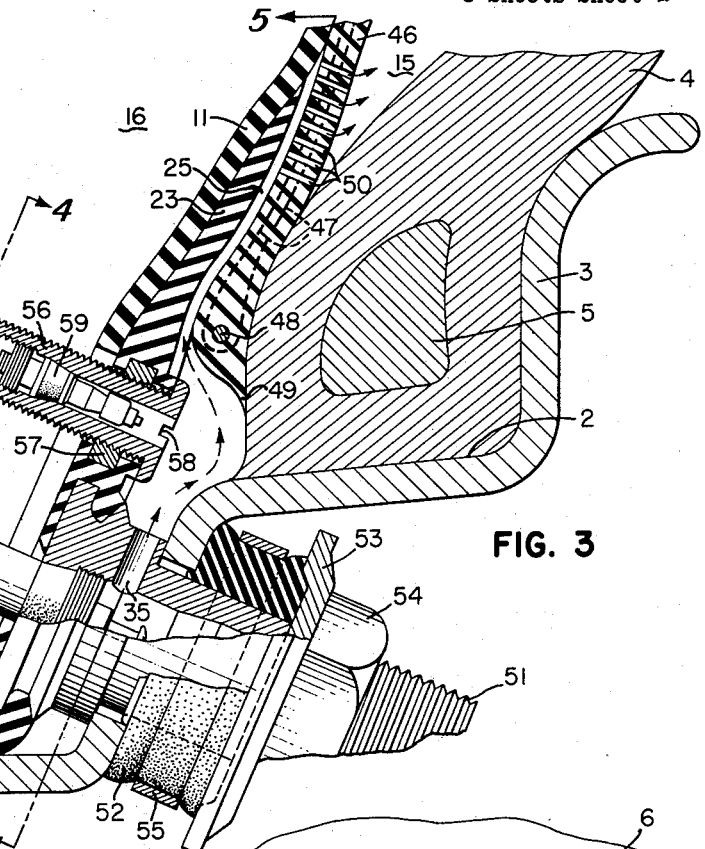
FIG. 3 is a fragmentary cross-section of another form of the invention.

FIGURE 3 illustrates a modified form of the invention shown in FIGS. 1 and 2. In this figure the same reference numerals indicate the corresponding parts shown in FIGS. 1 and 2. The principal difference between the modification shown in FIG. 3 and that shown in FIGS. 1 and 2 is that the inner tire 6 is modified, the valve mechanism includes a relief valve to prevent over-inflation of the inner chamber 16, an improved outside seal to the rim is provided, and the inner tire does not have to seat on the rim seat 2.

The inner tire 46 is provided with one or more cord layers 47 which extend between beads 48 of the inner tire 46 and are anchored thereto. Only one beaded area of the inner tire is shown, but the other is constructed in the same manner. The bead 48 is of a larger diameter than the bead 7 shown in FIGS. 1 and 2 and the inner edge of the inner tire is provided with a tapered toe portion 49 which lies against the inside of the tire bead. It will be noted that when the inner tire 46 is arranged within the tire 4, the beads 48 may be at a substantial distance from the bead seat 2 of the rim. Thus, mounting the tire 46 within the tire 4 is no problem because the beads 48 do not seat on the rim seats 2 as in FIG. 1. Also, there is no danger of breaking beads 48 at mounting in case they stay on rim seat 2 and do not go into the rim well. Furthermore, the molding of such a tire 46 can be accomplished with simpler molds because the shape of the rubber around the beads is not critical as in FIG. 1. While the outer surface of the inner tire may be provided with grooves as in FIG. 6 in order that air may reach the outer chamber 13 as in FIG. 1, it would be unnecessary to extend the grooves underneath the bead 48 since there is ample space for the air to reach the portions of the grooves at the outer surface of the inner tire 46.

The inner tire 46 shown in FIG. 3 may be provided with a series of perforations 50 which extend through the wall of the inner tire and these communicate with the grooves 25 in the base 23 of the valve 51. Thus, air reaches the outer chamber 15 from the valve stem 51 through the port 35, the valve grooves 25 in the valve base 23 and the perforations 50 in the wall of the inner tire 46. While these perforations are shown as having been purposely formed as by molding or puncturing, the inner tire 46 may be manufactured of pervious material so that air will pass therethrough into the outer chamber. As previously explained, it is not necessary that the inner tire be impervious since the inner tube 11 retains the air in the chamber 16. In other words, in this form of the invention definite perforations 50 may be formed in the inner tire after or during manufacture or, the inner tire may be loosely constructed to provide a multitude of random passages. In the form of the invention shown in FIG. 1 the inner tire also could be made with perforations such as 50 instead of providing the grooves shown therein.

The valve stem 51 is substantially identical with the valve stem 17 in FIG. 2 and the check valves and other mechanism shown in FIG. 2 may be provided interiorly of the valve stem for the purpose of supplying air to the ports 30 and 35 as in FIG. 2. One principal difference in the valve shown in FIG. 3 is in the sealing means for sealing the valve to the rim. Instead of placing rubber washers on both sides of the rim as in FIG. 1, only a single rubber 52 of a substantial thickness is provided between the rim 1 and a metal washer 53. A nut 54 is provided to advance the washer 53 into sealing engagement with the rim. To prevent undue expansion of washer 52 a restricting band 55, of less width than the thickness of the washer, is used. The rubber washer may be replaced without removing the tube 11 from the rim.

The rubber base 23 of the valve is provided with a housing 56 threaded in a nut 57 molded in the rubber base. Housing 56 has a slot 58 to receive a screw driver used for advancing the housing 56 into position. Slot 58 also prevents sealing off of the opening in the housing when the pressure in chamber 16 forces the tube outwardly against the inner wall of the tire 4. Valve core 59 may be of any desired construction and, as shown, is similar to check valve 44 of FIG. 2. This valve 59 is spring loaded (not shown) as in the usual construction and is designed to open when the pressure in the chamber 16 exceeds that in the chamber 15 by a predetermined amount to prevent building up the pressure in the inner chamber sufficient to cause a failure of any part of the tire and rim assembly. Thus, the valve 59 may be constructed to open when the pressure in the inner chamber exceeds that in the outer chamber by 40 pounds to thus allow air to pass into the outer chamber 15. This may build up the pressure above that desired in the outer chamber but this can always be reduced to the desired pressure by opening the outer valve core such as 44 (FIG. 2). By providing the valve core 59 the maximum differential pressure between the chambers may be controlled. In actual practice, the overall length of the valve stem 56 may be reduced so that it is no longer, or not appreciably longer, than the thickness of the inner tube plus the thickness of the valve base 23.

It will be noted that in case the pressure in the outer chamber is reduced to zero, as when the outer chamber 15 fails completely, the maximum pressure in chamber 16 can be no more than the pressure required to open the passage through the valve core 59; therefore, it is important that the valve core should not open at a pressure less than desired for run-flat operation.

In operation, air is supplied through the ports 30 and 35 to the chambers 16 and 15 respectively, similar to the manner in which the air is supplied to these chambers in FIGS. 1 and 2. If, because of repeated inflations or for any other reason, the differential pressure becomes more than the desired maximum pressure, then the relief valve 59 will open and allow the air to bleed from the inner chamber 16 to the outer chamber 15 from which it can be removed merely by opening the valve core 44 until the pressure in chamber 15 is that desired. This will not open the check valve 34.

Figure 7:
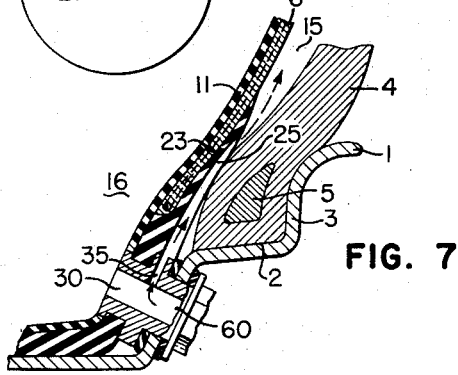
FIG. 7 is a cross-section of a modified construction.

FIGURE 7 shows a rim 1 and a tire 4, having a bead 5 mounted on the rim seat 2, the same as in the other figures. The details of the valve mechanism are not shown in this figure except to indicate generally a valve casing 60 having the ports 30 and 35 and the valve, in general, is constructed as shown in FIG. 2. The construction shown in FIG. 3 could also be used. However, it will be noted that in this form of the invention the valve base 23 is arranged outside of the inner tire 6 but need not be attached thereto except in the area around the port 30. Air is supplied to the outer chamber 15 from passage 35 through the grooves 25 the same as in FIGS. 1 or 2. This construction would be satisfactoy if the inner tire 6 and tube 11 were made integral. This integral construction, as previously mentioned, is not preferred but neither is it impractical. The chief disadvantage is that it would probably require more stock sizes as previously explained.

Figure 8:
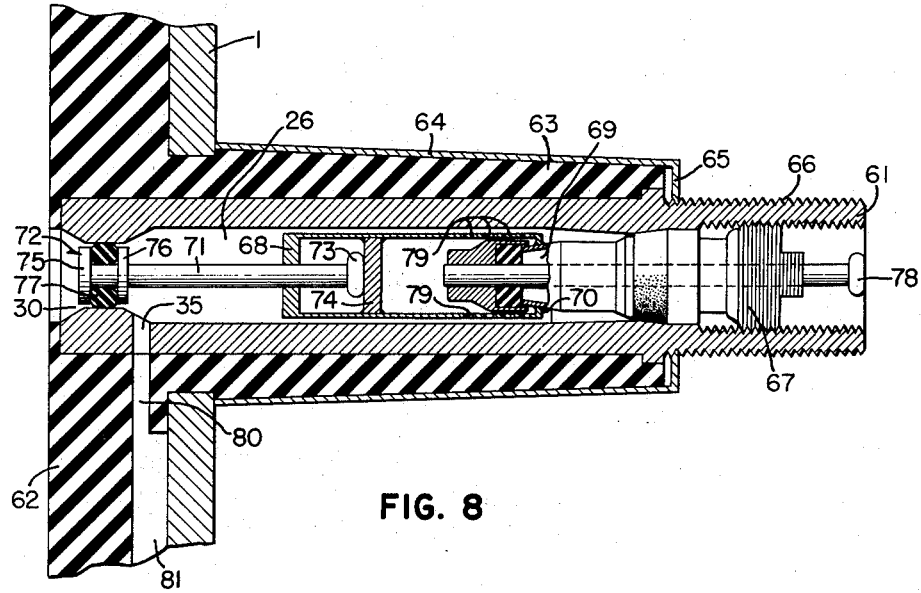
FIG. 8 shows a modified valve construction with the check valve and valve core in closed position.
Figure 9:
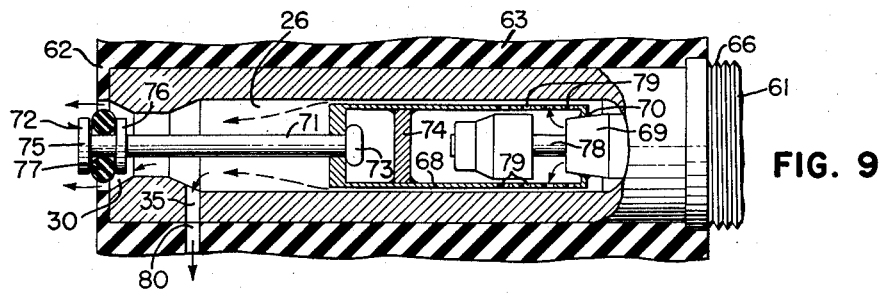
FIG. 9 is a view of the valve shown in FIG. 8 with the check valve and valve core in open position.

FIGS. 8 and 9 show a modification of the valve structure primarily with respect to the internal mechanism thereof. It is designed, however, to perform the same function as the valves shown in the other figures, but its principal advantages are in providing a structure in which, when the outer valve is removed, the inner valve is also removed as will appear from the description. The stem 61 of the valve has a port 30 and a port 35 the same as in the other forms of the invention. The valve has an all-rubber base 62 with a rubber extension 63 molded to the stem 61. A metal collar 64 encompasses the rubber stem 63 and has an inwardly directed flange 65 having internal threads threaded on the threaded portion 66 at the outer end of stem 61. When the collar 64 is tightened against rim 1, it draws the rubber base of the valve against the inner surface of the rim and seals the stem to the rim.

The outer end of the stem is provided with a valve core 67 similar to the check valve 44 and carries an integral cage 68 of tubular construction which is attached as by welding to the rigid barrel 69 of the valve core 67 at the point 70. Thus, the cage 68 will move only with the barrel 69 and will be withdrawn from the valve stem 62 when the valve core 67 is withdrawn. The inner end of the cage 68 is provided with an opening in which a stem 71 of an inner check valve 72 slides freely. This stem is provided with a head 73 adapted, in the position shown in FIG. 8, to engage the abutment 74 in the cage 68. Thus, while the check valve 72 has limited movement from the position shown in FIG. 8 to that shown in FIG. 9, it is still an integral part of the assembly and when the valve core 67 is withdrawn the valve 72 is also withdrawn therewith so that both chambers may be quickly deflated. The inner valve 72 has two integral flanges 75 and 76 at the end of the stem 71 to provide abutments to retain the O-ring 77 therebetween. In FIG. 8 the valve 67 is closed and so is the valve 72. When inflating, the pin 78 is depressed to allow air to enter the passage 26 through openings 79 and the pressure of the air in passage 26 will act on the valve 72 to open the valve 72 as in FIG. 9 and thus permit air to enter the inner chamber 16 through the port 30. The base 62 of the valve is all rubber and is provided with the passage 80 in alignment with port 35, and grooves 81 which are similar to the grooves 25 in the other forms of the invention. Air enters the outer chamber 15 through the port 35, passage 80 and grooves 81 formed in the base 62. After inflation, the pressure of the air in the inner chamber will return the valve 72 to the closed position shown in FIG. 8 and its movement will be limited by the engagement of the enlarged head 73 with the abutment 74. It will be understood that the valve base 62 shown in FIGS. 8 and 9 may be provided with a pressure relief valve similar to 59 shown in FIG. 3.

FIGS. 10 and 11 show two rims in which the bead seats are of different widths. These rims are designated as 82 and 83 respectively. It will be noted that in FIG. 10 the distance between the valve hole 84 in the rim 82 and the beaded edge of the tire 4 is greater than the distance between the opening 85 and the beaded edge of the tire 4 in FIG. 11. Thus when the inner tire 6 and the tube 11 are separate the same construction can be used for both rims and still have the inner tire and inner tube in proper relation to the outer tire.

In each form of the invention there is an inner tire within the outer tire and an inner tube within the inner tire with provision for inflation of the outer chamber 15 as well as the inner chamber 16 by use of a single inflating valve. Obviously the chambers could be separately inflated in any well known manner without destroying the operativeness of the inner tire under emergency use. The illustrated construction offers the advantage of single inflation, economy in manufacture and ease of mounting and dismounting and requires no special construction of the outer tire other than it should be of the tubeless variety. The valve structure may readily be adapted to differentially inflate other two-chambered tubes or tire constructions other than those illustrated but has particular application to the constructions shown.

It must be noted that while a differential pressure is desirable, this device will also operate if the chambers have equal pressures, but in that case it is preferable to cement the tires together at their beaded edges or provide other means to prevent chafing between the beaded edges.

Note that in FIG. 3 the inner wall of the tubeless tire forms support for the beads of the inner tire and restrains inward movement thereof even under emergency conditions when the outer chamber is deflated.

A light spring 33' arranged between the head on the stem 33 and the barrel 27 may be used, if necessary, to counteract the action of centrifugal force tending to open the valve 34. The spring should not be strong enough to prevent opening of the valve 34 under the pressure of the air entering the passage 26. A similar spring could also be used in the construction shown in FIG. 8 between the end of the cage 68 and the head 73.

The inner tire 46 (FIG. 3) may be cured in a mold using an air bag or an inflatable bladder. In either case it is unnecessary to provide special bead locating portions in the mold as it is immaterial that the toes 49 are specifically dimensioned—the pressure of the air bag or bladder forming it into a taper as shown. In most cases the inner tire 46 will not always be centered in the outer tire 4 even if the inner tire is perfectly shaped. Normally, since the tire is not centered in the mold, it will be found that the beads are not usually concentric and, therefore, the outer circumference is not concentric. This may cause eccentricity with respect to the tire 4 when mounted thereon. In either of the above cases the eccentricity will cause an out of balance that may be balanced out by wheel weights, but the eccentricity remains and when the outer chamber fails the eccentricity of the inner tire causes a vibration of the wheel axle which gives a sensible warning to the driver that the outer tire has failed. If it is desired to control the amount of eccentricity this may be done by cementing the inner tire to the outer tire when mounting the inner tire. The cementing need not be of a permanent type as the pressure in the inner tire will hold the inner tire in proper relation to the outer tire after inflation. Cementing would be particularly desirable if the inner tire were molded to a controlled concentricity. Then the beads could be cemented eccentrically to the outer tire.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. In combination, a rim and a tubeless tire mounted thereon to form an annular air space therebetween, an inner tire in said space separate from said tubeless tire spanning said space from one inner sidewall of said tubeless tire to the other inner sidewall thereof to divide said air space into an inner chamber and an outer chamber, an inner tube in said inner chamber which when inflated maintains the pressure in the inner chamber, means for inflating said inner tube and outer chamber comprising a valve stem attached to said inner tube and having a first passage for receiving air under pressure from a supply source, a first port in said stem communicating with said first passage and said outer chamber through a second passage extending from said first port to said outer chamber externally of said tube, a second port in said stem communicating with said first passage and the interior of said inner tube, a normally closed first check valve in said first passage at the outer end of said stem through which air may be supplied to and withdrawn from said first passage when said first check valve is in open position, and a second check valve in said stem for opening and closing said second port and constructed and arranged to open and permit air to flow into said inner chamber from said first passage when the opening force on said second valve, created by the pressure of the air in said first passage, exceeds the closing force on said second valve, which latter force is composed at least in part by the pressure of the air in the inner chamber, and closing completely when said opening force is less than said closing force, said first and second valves being mechanically unconnected whereby the mere movement of either valve will not actuate the other valve, the effective cross-sections of said first and second ports being so proportioned with respect to the respective volumes of the chambers with which they are connected that, when air under pressure is supplied to said first passage for inflating said tube and outer chamber and said second check valve is open, the rates of flow of air to said inner tube and outer chamber will be such as to insure a build-up of pressure in the inner chamber to a sufficiently higher ultimate pressure than in the outer chamber to insure holding said second valve closed under operational use, the independence of movement of said first and second valves permitting opening of said first valve without opening said second valve to measure the pressure in said outer chamber.

2. Safety means as set forth in claim 1 in which said second passage is formed at least in part by spacing means on at least one of the adjacent facing surfaces of said inner and outer tires to keep portions of said facing surfaces in spaced relation and in part by at least one groove at the outer surface of said inner tube extending from said first port to the spaced portions of said tires adjacent said spacing means at their facing surfaces.

3. The combination as set forth in claim 1 in which said inner tire has perforations therethrough and said second passage is formed by a groove at the outer surface of the tube extending from said first port to the inner surface of said inner tire with the perforate portion of said inner tire in communication with said second passage.

4. The combination as set forth in claim 1 in which said tube and inner tire are separate.

5. The combination as set forth in claim 1 in which said tube and inner tire are integral.

6. The combination as set forth in claim 1 in which at least one of the engaging faces of the tubeless tire and the inner tire is provided with a tacky material holding said tires in proper juxtaposed relation when mounting them together on the rim.

7. The combination as set forth in claim 1 in which the rim is provided with annular seats upon which the inner edges of both the inner tire and tubeless tire are mounted in direct engagement therewith.

8. The combination as set forth in claim 1 in which the rim is provided with annular seats upon which the inner edges of the tubeless tire are mounted and in which the inner edges of the inner tire are greater in diameter than said annular seats on the rim and engage the inner walls of said tubeless tire above the rim seat areas against which they are held by the air pressure in the inner chamber.

9. Safety means for use in an annular air space formed between a rim and an outer tubular tire mounted thereon comprising an inner tire dividing said air space into an inner chamber and an outer chamber, means for inflating said chambers comprising a valve stem having a passage for receiving air under pressure from a supply source, a first port in said stem communicating with said passage and said outer chamber, a second port in said stem communicating with said passage and said inner chamber, a normally closed first check valve in said passage at the outer end of said stem through which air may be supplied to and withdrawn from said passage when said first check valve is in open position, and a second check valve in said stem for controlling the flow of air through said second port and constructed and arranged to open and permit air to flow into said inner chamber from said first passage when the opening force on said second valve, created by the pressure of the air in said passage, exceeds the closing force on said second valve, which latter force is composed at least in part by the pressure of the air in the inner chamber, and closing when said opening force is less than said closing force, said first and second valves being mechanically unconnected whereby the mere movement of either valve will not actuate the other valve, the effective cross-sections of said first and second ports being so proportioned that when air under pressure is supplied to said passage for inflating said chambers and said second check valve is open the rates of flow of air to said inner and outer chambers will result in a build-up of pressure in the inner chamber at a substantially greater rate and to a substantially higher ultimate pressure than in the outer chamber, the independence of movement of said first and second valves permitting opening of said first valve without opening said second valve to measure the pressure in said outer chamber, said valve mechanism including a normally closed third check valve having yielding means holding it in closed position against the pressure in the inner chamber and openable to release air from said inner chamber if and when the pressure therein exceeds that in said outer chamber by an amount sufficient to overcome the force of said yielding means.

10. Valve mechanism for use in inflating both chambers of a safety tire having inner and outer chambers, comprising a valve stem having a passage therein, a first port leading from said passage for communication with said outer chamber, a second port leading from said passage for communication with said inner chamber, a normally closed first check valve at the outer end of said stem for permitting air under pressure to enter said stem from a source of supply when said check valve is open for distribution of the air to said inner and outer chambers through their respective ports, a second check valve in said stem for controlling the flow of air through said second port and openable under a sufficient superior pressure in said passage to allow air to pass into said inner chamber, said first and second valves being mechanically unconnected whereby to be independently operable whereby mere opening of said first check valve will not open said second check valve, said first and second ports having effective cross-sections in respect to the volumes of the chambers with which they are connected such that during inflation air will flow through said ports at such rates as to insure an ultimate pressure in the inner chamber greater than in said outer chamber, said valve mechanism including a normally closed third check valve arranged between said inner and outer chambers operable to release air from said inner chamber if and when the pressure therein exceeds that in the outer chamber by a predetermined amount.

11. Valve mechanism as set forth in claim 10 in which said stem has a base portion extending laterally thereof, said base portion being provided with a third port in which said third check valve is mounted.

12. Valve mechanism as set forth in claim 10 in which said stem has a base portion extending laterally thereof, said base portion being provided with a third port therethrough in which said third check valve is mounted and in which said base has at least one air passage communicating with said first and third ports.

13. In a valve mechanism having means for inflating a tire and including a stem by which air may be supplied to said tire, and means on said stem for air sealing the stem to a rim when the stem is arranged in a hole in the rim, comprising a fixed abutment on the stem for engaging the inner surface of the rim adjacent said hole and a removable sealing means on said stem for engaging the rim externally thereof comprising an annular resilient washer of elastomeric material having substantial thickness axially of said stem and removably mounted on said stem, a nut threaded on said stem axially outwardly of said washer to move said washer into sealing engagement with said rim and to compress the washer snugly against the rim, and a non-stretchable band of less width than the thickness of the washer snugly embracing the washer at its circumference but spaced from its opposite end faces to restrict expansion of the washer whereby said band is free to tilt angularly with respect to the axis of the valve stem and to move transversely of said axis when displaced by engagement with a portion of the rim.

14. In combination, a rim and a tubeless tire mounted thereon to form an annular air space therebetween, an inner tire dividing said air space into an inner chamber and an outer chamber, means for inflating said chambers comprising a valve stem having a passage for receiving air under pressure from a supply source, a first port in said stem communicating with said passage and said outer chamber, a second port in said stem communicating with said passage and said inner chamber, a normally closed first check valve in said passage at the outer end of said stem through which air may be supplied to and withdrawn from said passage when said first check valve is in open position, and a second check valve in said stem for opening and closing said second port and constructed and arranged to open and permit air to flow into said inner chamber from said passage when the opening force on said second valve created by the pressure of the air in said passage exceeds the closing force on said second valve, which latter force is composed at least in part by the pressure of the air in the inner chamber, and closing completely when said opening force is less than said closing force, said first and second valves being mechanically unconnected whereby the mere movement of either valve will not actuate the other valve, the effective cross-sections of said first and second ports being so proportioned with respect to the respective volumes of the chambers with which they are connected that, when air under pressure is supplied to said passage for inflating said chambers and said second check valve is open, the rates of flow of air to said inner and outer chambers will be such as to insure a build-up of pressure in the inner chamber to a sufficiently higher ultimate pressure than in the outer chamber to insure holding said second valve closed under operational use, the independence of movement of said first and second valves permitting opening of said first valve without opening said second valve to measure the pressure in said outer chamber, said first and second check valves being mounted on a common cage removably mounted as a unit in said stem, said cage having its interior in open communication with said passage when in said passage and, when in said operative position in said passage, positioning said second check valve in operative position to control the flow of air through said second port.

15. Valve mechanism as set forth in claim 14 in which said second check valve comprises a pin slidably, but non-removably mounted on said cage, an O-ring at the inner end of said pin, and retaining means for holding said O-ring against substantial axial movement along said pin, said O-ring being arranged on said pin to enter said second port when said cage is in operative position and pass therethrough to open said port under the inflation pressure in said passage and to close said first port when the pressure of the air in the inner chamber is greater than that in said passage, and stop means for limiting the movement of the O-ring to and from a position closing said second port.

References Cited by the Examiner

UNITED STATES PATENTS

| | | | |
|---|---|---|---|
| 2,122,740 | 7/38 | Eckenroth | 152—342 |
| 2,207,212 | 7/40 | Arey | 152—342 |
| 2,216,368 | 10/40 | Hollingshead | 152—342 |
| 2,501,937 | 3/50 | Gramelspacher | 152—342 |
| 2,675,846 | 4/54 | Wyman | 152—340 |
| 2,685,905 | 8/54 | Chandley | 152—342 |
| 2,713,372 | 7/55 | Darrow | 152—342 |
| 2,731,061 | 1/56 | Clark | 152—341 |
| 2,744,559 | 5/56 | Leonetti | 152—427 |
| 2,754,875 | 7/56 | King et al. | 152—341 |
| 2,871,904 | 2/59 | Greenlee | 152—341 |
| 2,934,127 | 4/60 | Howard | 152—341 X |
| 3,081,810 | 3/63 | McConkie | 152—375 X |

ARTHUR L. LA POINT, *Primary Examiner.*